United States Patent

Yurasek et al.

[15] 3,643,213
[45] Feb. 15, 1972

[54] METHOD AND MEANS FOR PROVIDING A SYNTHETIC REAL WORLD RUNWAY DISPLAY

[72] Inventors: John F. Yurasek, Oakland; Abner Owens, Jr., Paramus, both of N.J.

[73] Assignee: The Bendix Corporation

[22] Filed: Nov. 24, 1969

[21] Appl. No.: 879,069

[52] U.S. Cl. .....................................340/27 NA, 343/108 R
[51] Int. Cl. .........................................................G08g 5/02
[58] Field of Search ...............340/25, 26, 27 NA; 343/108 R

[56] References Cited

UNITED STATES PATENTS

| | | | |
|---|---|---|---|
| 3,345,632 | 10/1967 | Rover, Jr. | 343/108 |
| 3,305,865 | 2/1967 | Gassler | 343/108 |
| 3,324,471 | 6/1967 | Rover, Jr. | 343/108 |

*Primary Examiner*—Kathleen H. Claffy
*Assistant Examiner*—Randall P. Myers
*Attorney*—Ronald G. Gillespie and Plante, Arens, Hartz, Smith and Thompson

[57] ABSTRACT

A system for providing a perspective of a synthetic real world runway on a cathode-ray tube in a heads-up display system for guiding a pilot while landing an aircraft on the real world runway when visibility is poor. The perspective of the synthetic runway changes in accordance with changes in the position of the aircraft to the real world runway. A waveform generator provides waveforms corresponding to the synthetic runway to a computer which modifies the waveforms in accordance with received signals from the airport, such as instrument landing system (ILS) and range signals, and signals corresponding to sensed conditions, such as altitude, pitch, roll and yaw, to provide deflection voltages to the cathode-ray tube which displays the perspective synthetic real world runway in accordance with the deflection voltages from the computer.

6 Claims, 20 Drawing Figures

INVENTORS:
JOHN F. YURASEK
ABNER OWENS, JR.
BY
Ronald G. Gillespie
ATTORNEY

INVENTORS:
JOHN F. YURASEK
ABNER OWENS, JR.
BY Ronald G. Gillespie
ATTORNEY

METHOD AND MEANS FOR PROVIDING A SYNTHETIC REAL WORLD RUNWAY DISPLAY

BACKGROUND OF THE INVENTION

1. Field of the Invention

The present invention relates to displaying in an aircraft a synthetic runway corresponding in a one-to-one relationship to an actual runway as it appears to a pilot in an aircraft approaching the actual runway.

2. Description of the Prior Art

Heretofore, runway image-generating apparatus in an aircraft such as that disclosed in U.S. Pat. No. 3,345,632 issued Oct. 3, 1967 to R.R. Rover, Jr. uses a considerable number of parts in generating a runway image from signals received from an airport, and from signals corresponding to sensed conditions. The present invention differs from the Rover system by generating deflection voltages for a synthetic runway image and then modifying the deflection voltages in accordance with signals from the airport and the sensed condition signals. By first generating waveforms corresponding to the synthetic runway, the number of parts necessary to provide a one-to-one relationship to the actual runway is reduced. The present invention further differs from the Rover system in providing a solid state display and avoiding the use of electromechanical devices.

SUMMARY OF THE INVENTION

A system in an aircraft for displaying a perspective synthetic runway corresponding to a runway at an airport; comprising means for providing deflection voltages and bright-up pulse voltages for displaying a synthetic runway. Location signal means provides signals corresponding to the location of the aircraft from the airport runway. Attitude signal means provides signals corresponding to the attitude of the aircraft, while altitude signal means provides a signal corresponding to the altitude of the aircraft. Modifying means modify the deflection voltages in accordance with the location, attitude and altitude signals. The voltage means and the modifying means provide the bright-up pulse voltages and the modified deflection voltages, respectively, to a cathode-ray tube to cause the cathode ray tube to display the perspective synthetic runway corresponding to the airport runway.

One object of the present invention is to provide a perspective synthetic real world runway having markers for indicating distance.

Another object of the present invention is to display runway lines as dashed lines to provide a pilot of an aircraft with a sense of speed as he is landing the aircraft.

Another object of the present invention is to provide a runway display system having a fewer number of parts than runway display systems used heretofore.

Another object of the present invention is to generate deflection voltages for a synthetic runway and modifying the deflection voltages in accordance with signals received from an airport and with signals corresponding to sensed conditions for displaying a perspective synthetic runway corresponding to a runway at the airport.

Another object of the present invention is to display a synthetic runway in an aircraft landing at a runway of an airport, whose position and perspective changes in a one to one relationship to the runway at the airport.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

It is desirable to provide the pilot of an aircraft with a visual display of a synthetic runway, when visibility is poor, which overlays and outlines a safe landing zone on the runway of an airport that the aircraft is attempting to land on. It is important that the synthetic runway changes in a one to one relationship to the actual runway to simulate the appearance of the actual runway as the relationship between the aircraft and the actual runway changes.

Figure 1:
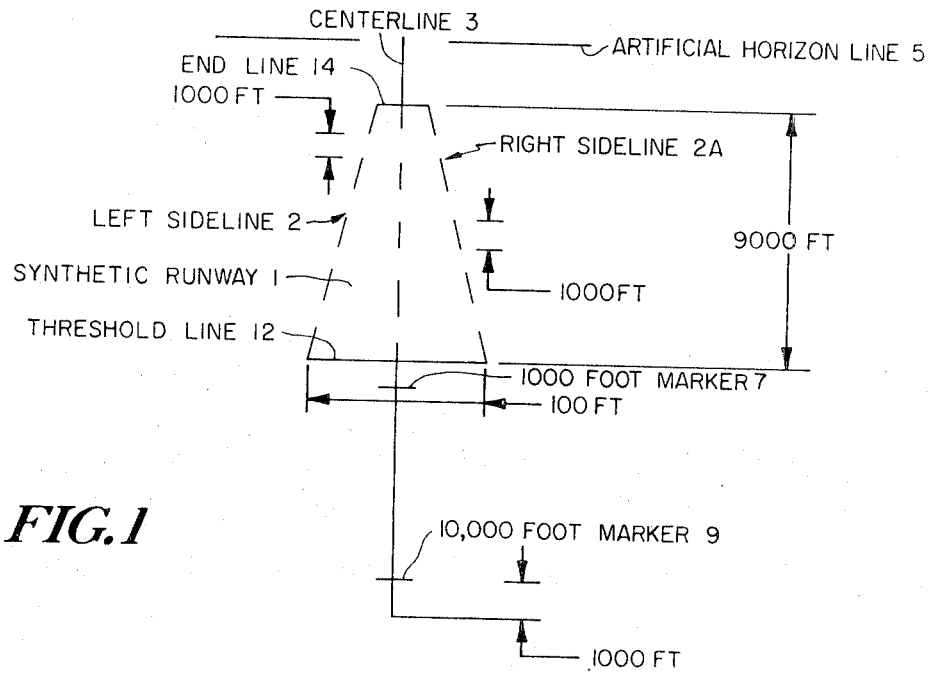
FIG. 1 is a visual display of a synthetic real world runway with range markers and artificial horizon for aiding a pilot in landing an aircraft when visibility is poor.

Referring to FIG. 1, there is shown a display of a synthetic runway 1 on a heads-up display device having sidelines 2 and 2A and a center line 3 divided into 1,000 foot segments to provide the pilot with a sense of speed as he is landing. An artificial horizon line 5 informs the pilot of the attitude of the aircraft about the roll and pitch axes. The position and size of synthetic runway 1 convey an impression of distance of the aircraft from the runway and the orientation of synthetic runway 1 provides a sense of the pitch, roll and yaw attitudes of the aircraft. Range markers 7 and 9 also provide information relative to the distance of the aircraft from the actual runway. Threshold line 12 and end line 14 provide information corresponding to the start and end of the safe landing area.

Figure 2:
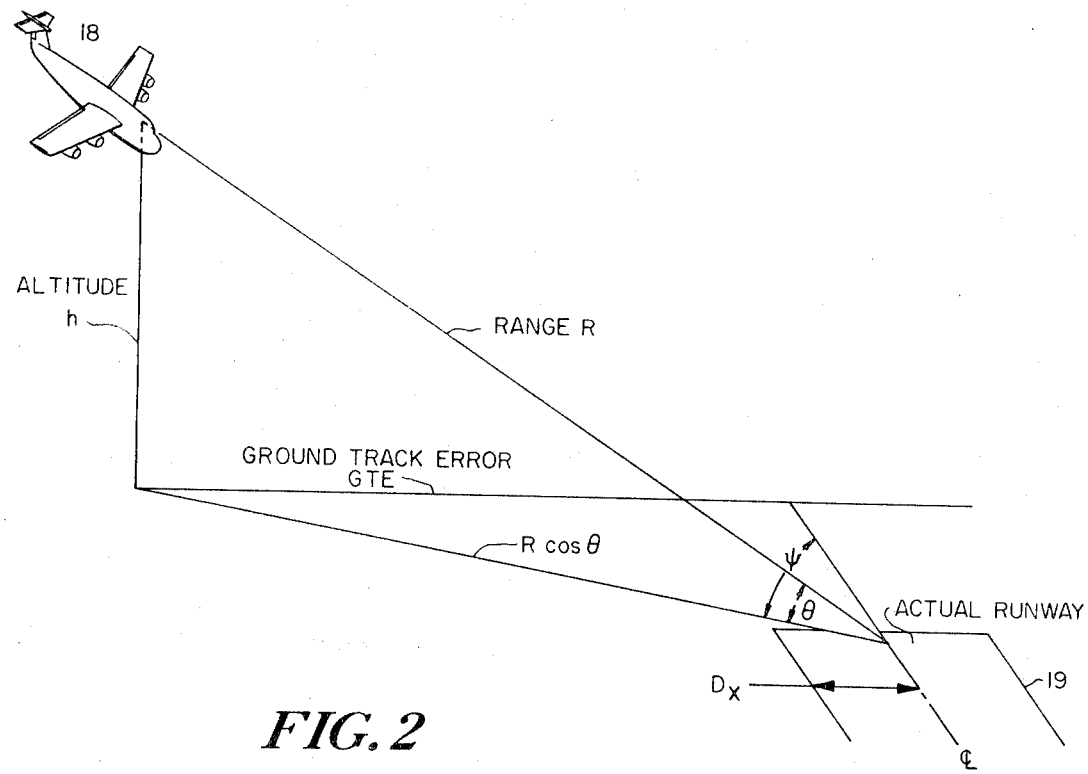
FIG. 2 shows an aircraft approaching a runway at an airport.

Referring to FIGS. 1 and 2, there is shown the relationship of an aircraft 18 to a landing runway 19. It can be generally stated that the runway image size is inversely proportional to the range of the aircraft 18 from the actual runway 19. Using the small angle approximation $$\theta = h/R \qquad 1.$$

the $Y$ component of the image is dependent on the altitude and range as follows:

$$F(Y) = V_Y(h/R) \qquad 2.$$

wherein $F(Y)$ is the $Y$ component, and $V_Y$ is a deflection voltage.

The $X$ axis component of the image is inversely proportional to range R, or $$F(x) = V_X/R \qquad 3.$$

where $V_X$ is another deflection voltage.

The ground track error $GTE$ is the distance that aircraft 18 is misaligned with the centerline of the actual runway as shown in FIG. 2. The error $GTE$ effects the positioning of the synthetic runway and is as follows:

$$GTE = R \cos \theta \tan \psi \qquad 4.$$

which implies to $$GTE \cong R \psi \qquad 5.$$

when using the small angle approximation for angles $\theta$ and $\psi$.

Sidelines 2 and 2A are closer to the centerline 3 at the top of the simulated runway 1 than at the bottom to show the runway in perspective. However, the sidelines of the actual runway are at a fixed distance $D_X$. Therefore for the sidelines 2 and 2A, the $X$ component of the image varies as a function of time, the range $R$ and angle $\psi$ while for centerline 3, the $X$ component of the image varies as a function of angle $\psi$ and time. The general equation for sidelines 2, 2A and centerline 3 is $$F(X) = \psi V_X \pm D_X \qquad 6.$$

For centerline 3, $D_X = 0$ so that equation 6 is written as $$F(X)_{C.L.} = \psi V_J(t) \qquad 7.$$

where the subscript C.L. refers to the centerline 3.

The voltage $V_J(t)$ is a ramp voltage increasing in a positive sense with time.

The sideline X components of the image are as follows $$F(X)_{R.S.} = \psi V_R(t) + D_X \qquad 8.$$
$$F(X)_{L.S.} = \psi V_L(t) - D_X \qquad 9.$$

The subscript R.S. and L.S. refer to the right and left sidelines, respectively. Voltages $V_M(t)$ and $V_N(t)$ are ramp voltages increasing in a negative sense with time. The term $D_X$ is also an $X$ component and must have the same characteristics of equation 3, therefore equations 8 and 9 may be written as $$F(X)_{R.S.} = \psi V_K(t) + \frac{V_K(t)}{R} \qquad (10)$$

and $$F(X)_{L.S.} = \psi V_L(t) - \frac{V_L(t)}{R} \qquad (11)$$

respectively. Factoring equations 10 and 11, they are rewritten as $$F(X)_{R.S.} = V_K(t)\left(\psi + \frac{1}{R}\right) \qquad (12)$$

and $$F(X)_{L.S.} = V_L(t)\left(\psi - \frac{1}{R}\right) \qquad (13)$$

respectively.

Markers 7, 9 and lines 12, 14 have $X$ components which vary as a function of ground tracker error angle $\psi$ and the range $R$ of the aircraft 18 from the runway 19 as shown in the following equations:

$$F(X)_{1,000} = V_M\psi + \frac{V_{MK}(t)}{R} \qquad (14)$$

$$F(X)_{10,000} = V_N\psi + \frac{V_{MK}(t)}{R} \qquad (15)$$

and $$F(X)_{threshold} = V_O\psi + \frac{V_{MK}(t)}{R} \qquad (16)$$

$$F(X)_{endline} = V_P\psi + \frac{V_{MK}(t)}{R} \qquad (17)$$

where voltages $V_M$, $V_N$, $V_O$ and $V_P$ are direct current voltages and $V_{MK}(t)$ is a ramp voltage increasing in a positive sense with time.

The $Y$ components of the image vary as a function of altitude $h$ and range $R$ as shown in the following equations:

$$F(Y)_{R.S.} = V_Q(t)(h/R) \qquad 18,$$
$$F(Y)_{L.S.} = V_R(t)(h/R) \qquad 19,$$
$$F(Y)_{C.L.} = V_S(t)(h/R) \qquad 20,$$
$$F(Y)_{1,000} = V_T(h/R) \qquad 21,$$
$$F(Y)_{10,000} = V_U(h/R) \qquad 22,$$
$$F(Y)_{threshold} = V_V(h/R) \qquad 23, \text{ and}$$
$$F(Y)_{endline} = V_W(h/R) \qquad 24;$$

where $V_Q(t)$ and $V_S(t)$ are ramp voltages increasing in a negative sense with time, $V_R(t)$ is a ramp voltage increasing in a positive sense with time, and $V_T$ through $V_W$ are negative direct current voltages.

Figure 3:
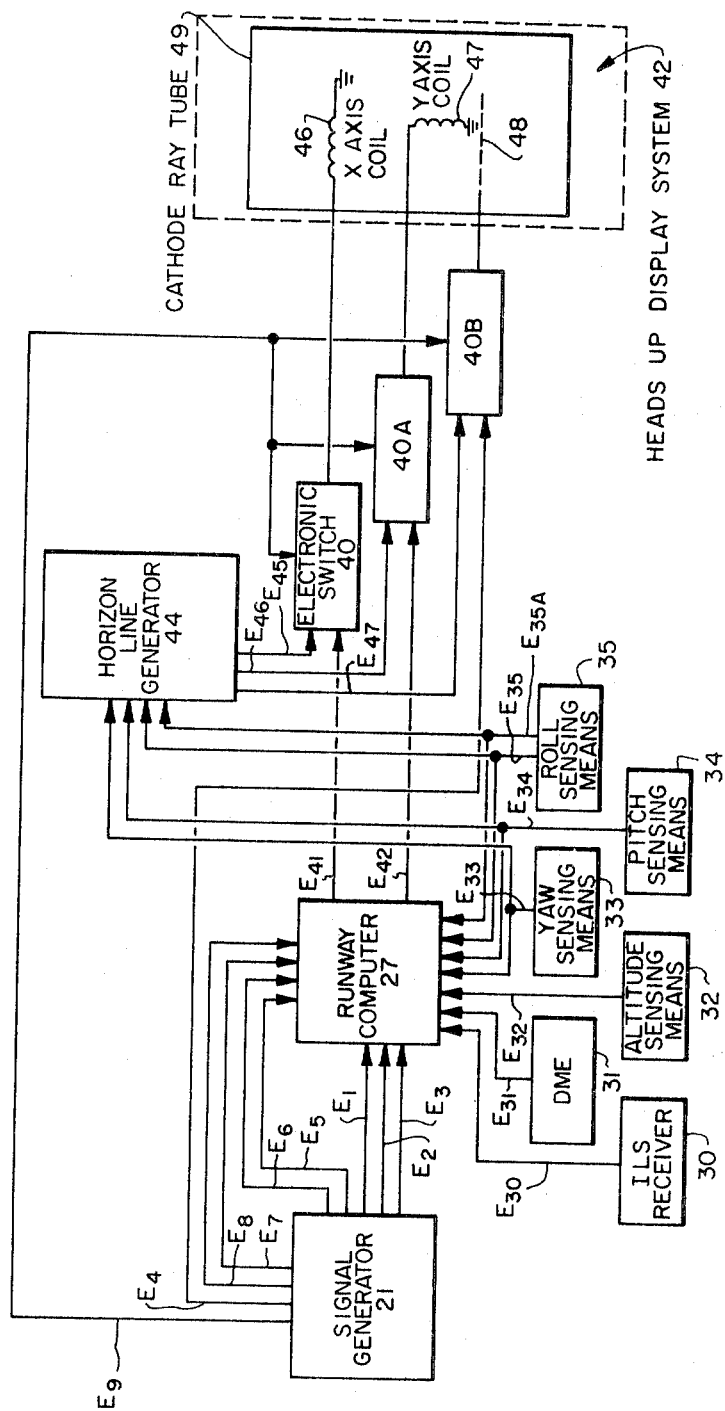
FIG. 3 is a block diagram of an electronic system constructed in accordance with the present invention for providing the display of FIGURE 1.

Referring to FIG. 3, there is shown a system for providing the runway display of FIG. 1 including a signal generator 21 providing signals $E_1$ through $E_4$ having the waveforms shown in FIGS. 4A through 4D, respectively. A computer 27 modifies signals $E_1$ through $E_3$ in accordance with signals $E_{30}$ through $E_{35A}$ received from ILS receiver 30, distance-measuring equipment 31 and sensing means 32 through 35, respectively, corresponding to the sensed conditions and to the relationship of the aircraft to the actual runway of the airport. Receiver 30 receives the ILS signal from the airport and provides signal $E_{30}$ corresponding to the ground track error angle $\psi$ and distance measuring equipment 31 provides a signal $E_{31}$ corresponding to the range of the aircraft 18 from the airport. Sensing means 32, 33 and 34 provide signals $E_{32}$, $E_{33}$ and $E_{34}$, respectively, corresponding to the altitude, yaw, and pitch of the aircraft 18, respectively, while sensing means 35 provides signals $E_{35}$, $E_{35A}$ corresponding to the cosine and sine, respectively, of the roll angle of aircraft 18.

Computer 27 modifies signals $E_1$, $E_2$ and $E_3$ and provides signals $E_{41}$ and $E_{42}$ to electronic switches 40 and 40A respectively. Switches 40, 40A pass signals $E_{41}$ and $E_{42}$, respectively, in response to a signal $E_9$ from signal generator 21. Bright-up signal $E_4$ from signal generator 21 is also passed by electronic switch 40B in response to signal $E_9$. Electronic switches 40, 40A and 40B control the application of signals to a heads-up display system 42, so that synthetic runway 1 and the artificial horizon line 5 may be displayed simultaneously.

A horizon line generator 44, which may be of a type well known in the art, provides signals $E_{45}$, $E_{46}$ and $E_{47}$ which are used to effect display of the horizon line 5 shown in FIG. 1. Horizon line generator 44 receives yaw and pitch signals $E_{33}$ and $E_{34}$, respectively, from sensing means 33 and 34, respectively, and roll signals $E_{35}$ and $E_{35A}$ from sensing means 35. Switches 40, 40A and 40B pass signals $E_{45}$, $E_{46}$ and $E_{47}$, respectively, from horizon line generator 44 to deflection coils 46, 47 and a grid 48, respectively, of a cathode-ray tube 49 in a heads-up display system 42 when the switches are not passing signals $E_4$, $E_{41}$ and $E_{42}$. The display by display system 42 is such that it overlaps the real world runway so that the pilot views the synthetic runway 1 as if he was viewing the real world runway 19.

Figure 5:
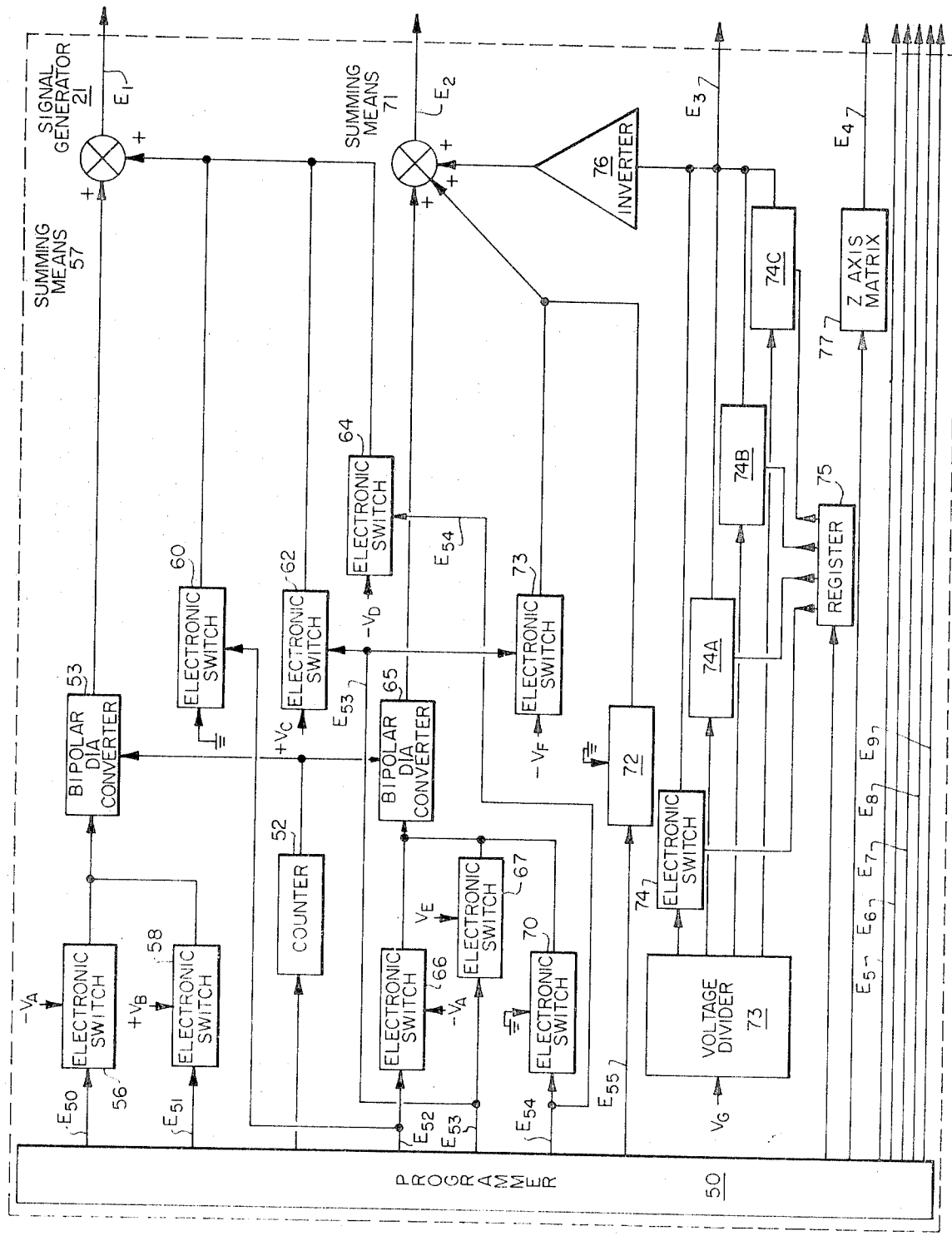
FIGS. 5 and 6 are block diagrams of the signal generator and the runway computer, respectively, shown in FIG. 3.
Figure 6:
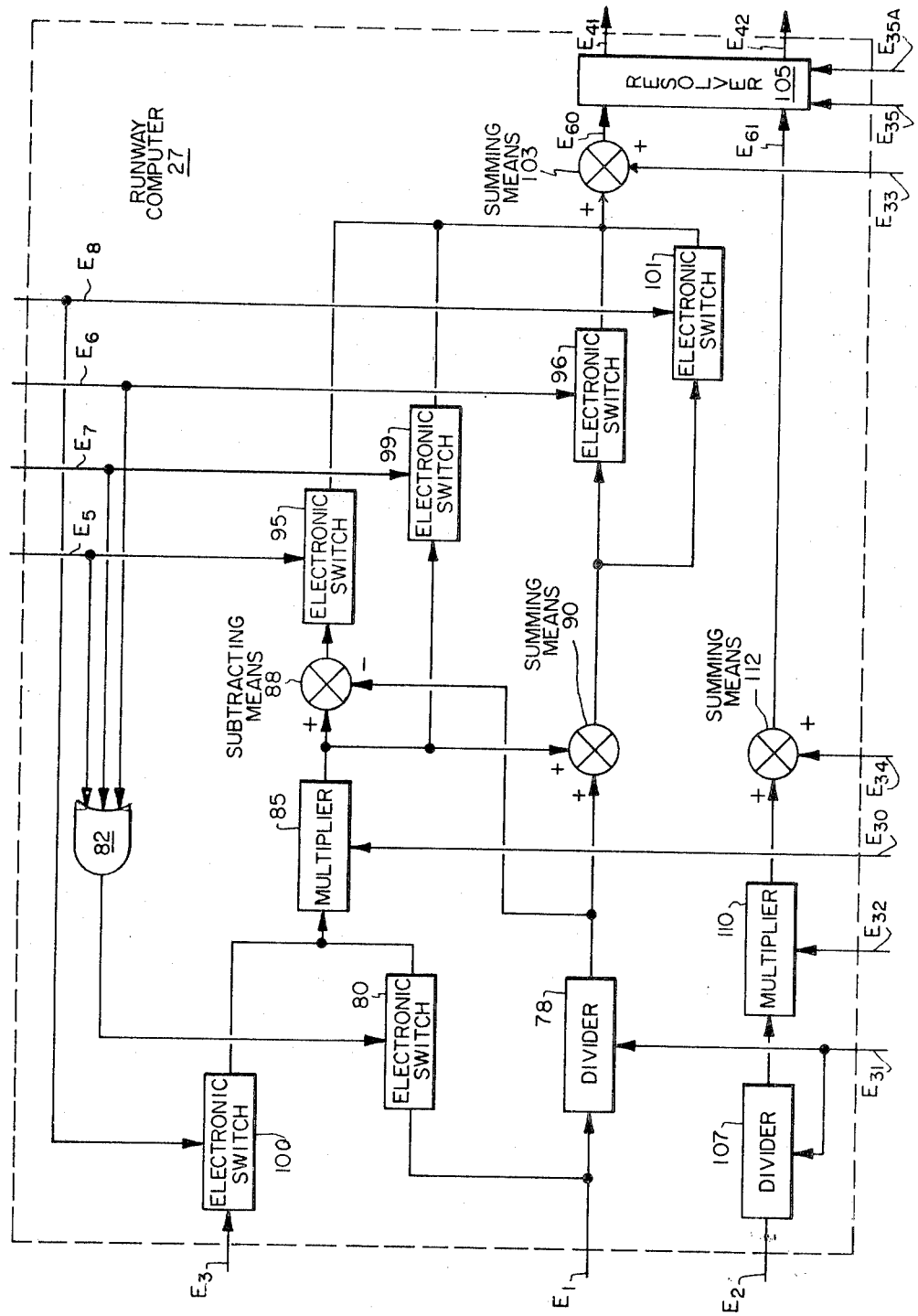

Referring to FIG. 5, a programmer 50 provides a variable frequency counting pulse train to a conventional type counter 52 which in turn provides a plurality of digital outputs corresponding to its count that are used in the generation of signals $E_1$ and $E_2$. The circuit for generating signal $E_1$ includes electronic switches 56 and 58, controlled by signals $E_{50}$ and $E_{51}$, respectively, from programmer 50, to pass direct current voltages $-V_A$ and $+V_B$, respectively, to a conventional type bipolar digital-to-analog converter 53 during different time periods of each cycle of signal $E_1$.

Converter 53 converts the digital output from counter 52 to a positive ramp voltage during time periods $t_3$ through $t_7$ or a negative ramp voltage during time periods $t_1$ and $t_2$ in response to voltage $+V_B$ or $-V_A$, respectively, to summing means 57 which provides the ramp voltage as signal $E_1$ or sums the ramp voltage with other direct current voltages to offset it as required.

Electronic switches 60, 62, 64, which are controlled by signals $E_{52}$, $E_{53}$ and $E_{54}$, respectively, from programmer 50, provide a ground reference, during time periods $t_1$ and $t_3$; a positive direct current voltage $+V_C$, during time period $t_3$; and a negative direct current voltage $-V_D$, during time periods $t_4$ through $t_7$; respectively, to summing means 57.

The circuit for generating signal $E_2$ includes a bipolar digital-to-analog converter 65, controlled by electronic switches 66, 67 and 70 for converting the digital output from counter 52. During time periods $t_1$ and $t_3$, switch 65 applies direct current voltage $-V_A$ to converter 67 in response to signal $E_{52}$. Electronic switch 67 passes a positive direct current voltage $V_E$ to converter 65 in response to signal $E_{53}$ during time period $t_3$, and electronic switch 70 grounds the input of converter 67 in response to signal $E_{54}$ during time periods $t_4$ through $t_7$. Converter 67 converts the count in counter 52 to a negative range voltage in response to voltage $-V_A$, to a positive ramp voltage in response to voltage $-V_E$ and provides no output when switch 66 is activated. Converter 67 provides the ramp voltage to summing means 71 which provides signal $E_2$.

During the time periods $t_1$ and $t_3$, an electronic switch 72 grounds an input to summing means 71 in response to signal $E_{55}$ from programmer 50 so that means 71 provides the negative ramp output from converter 65 as signal $E_2$. During time period $t_2$, summing means 68 sums the positive ramp output from converter 65 with a negative direct current voltage $-V_F$ passed by an electronic switch 73 in response to signal $E_{53}$ from programmer 50.

A voltage divider 73 receives a positive direct current voltage $V_G$ and provides a plurality of outputs to electronic switches 74 through 74C which are controlled by a register 75. Register 75 is controlled by a signal from programmer 50 to sequentially activate switches 74 through 74C to provide a negative going step voltage as signal $E_3$, as shown in FIG. 4C, during time periods $t_4$ through $t_7$.

The outputs from switches 74 through 74C are also applied to summing means 71 through an inverter 76 resulting in summing means 71 providing a positive-going step voltage during time periods $t_4$ through $t_7$.

Figure 4:
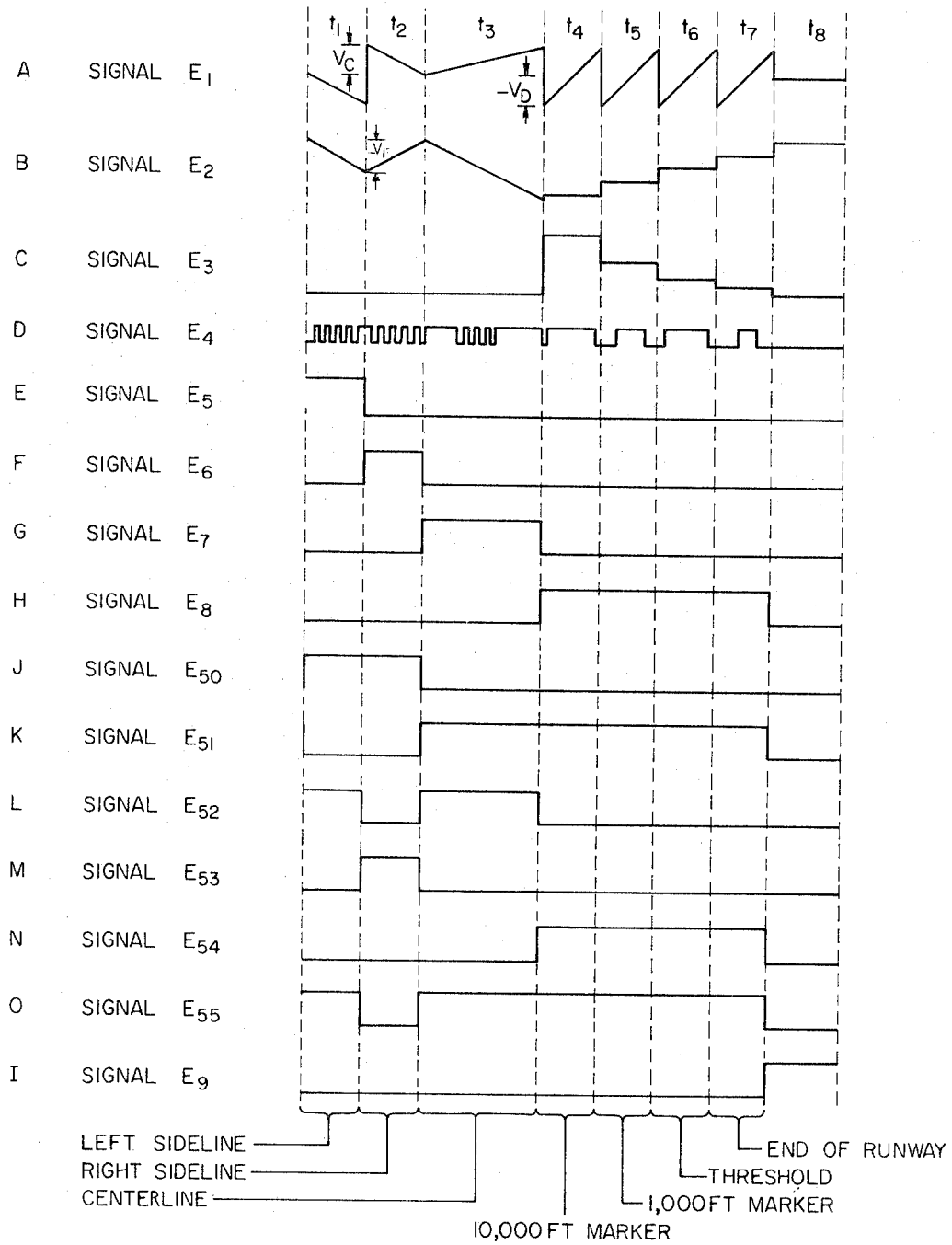
FIGS. 4A to 4D are diagrammatic representations of generated signals required to provide the display of FIG. 1.
FIGS. 4E to 4I are diagrammatic representations of timing signals for providing the generated signals of FIGS. 4A to 4D.

Programmer 50 provides a timing signal to a matrix 77 which in turn provides signal $E_4$ as shown in FIG. 4D. Matrix 77, although not shown in detail, may be of a diode matrix type having an internal transfer register and control logic.

Programmer 50 also provides signals $E_5$ through $E_9$, as shown in FIGS. 4E through 4I, for controlling the runway computer 27, as hereinafter explained, and switches 40, 40A, 40B. Signal $E_1$ is applied to a divider 78 in runway computer 27 and to an electronic switch 80. Divider 78 divides signal $E_1$ by range signal $E_{31}$ from distance measuring equipment 31 to provide a signal corresponding to $$\frac{V_K(t)}{R} \text{ and } \frac{V_L(t)}{R}$$

of equations 12 and 13, respectively, for time periods $t_1$ and $t_2$, respectively, and to $$\frac{V_{MK}(t)}{R}$$

of equations 14 through 17 during time periods $t_4$ through $t_7$.

During time periods $t_1$, $t_2$ and $t_3$, signals $E_5$, $E_6$ and $E_7$, respectively, from signal generator 21 pass through an OR-gate 82 to control electronic switch 80 to pass signal $E_1$ to a multiplier 85 where signal $E_1$ is multiplied with the error angle $\psi$ signal $E_{30}$ from receiver 30 to provide a signal corresponding to $\psi V_K(t)$ and $\psi V_L(t)$ of equations 12 and 13, respectively. Subtracting means 88 subtracts the signal from divider 78 from the signal from multiplier 85 and provides a signal corresponding to $$V_L(t)\left\{\psi - \frac{1}{R}\right\}$$

of equation 13 to summing means 103 through switch 95 which is activated only during time period $t_1$ by pulse $E_5$ from signal generator 21. Summing means 103 sums the signal from switch 95 with yaw signal $E_{33}$ from yaw sensing means 34 to provide signal $E_{60}$.

Summing means 90 sums the signal from divider 78 with the signal from multiplier 85 to provide a signal corresponding to $$V_K(t)\left\{\psi + \frac{1}{R}\right\}$$

of equation 12 during time period $t_2$. An electronic switch 96 is controlled by signal $E_6$ to pass the signal from summing means 90 to summing means 103 only during time period $t_2$ where it is summed with yaw signal $E_{33}$.

During time period $t_3$, an electronic switch 99 is enabled by signal $E_7$ to pass the signal from multiplier 85 corresponding to $\psi V_J(t)$ of equation 7 to summing means 103 where it is summed with yaw signal $E_{33}$ to provide signal $E_{60}$ for time period $t_3$.

During time periods $t_4$ through $t_7$, electronic switches 100, 101 are enabled by signal $E_8$ from waveform generator 21. Switch 100 passes signal $E_3$ to multiplier 85 where signal $E_3$ is multiplied with the error angle $\psi$ signal $E_{30}$ to provide a signal corresponding to $\psi V_M$ through $\psi V_P$ of equations 14 through 17, respectively. Summing means 90 sums the signal from multiplier 90 with the signal from divider 78 to provide a signal corresponding to $$\frac{V_{MK}(t)}{R}$$

of equations 14 through 17 to summing means 103 through switch 101 where it is summed with yaw signal $E_{33}$ to provide signal $E_{60}$ for time periods $t_4$ through $t_7$.

Signal $E_2$ from signal generator 21 is applied to a divider 107, during periods $t_1$ through $t_7$, where it is divided by range signal $E_{31}$ to provide a signal to a multiplier 110. Multiplier 110 multiplies the signal from divider 107 with altitude signal $E_{32}$ to provide a signal to summing means 112 corresponding to $V_Q(t)(h/R)$ through $V_n h/R$ of equations 18 through 24, respectively, during time periods $t_1$ through $t_7$, respectively. Summing means 112 sums the signal from multiplier 110 with pitch signal $E_{34}$ to provide signal $E_{61}$.

Resolver 105 resolves signals $E_{60}$, $E_{61}$ with signals $E_{35}$, $E_{35A}$ corresponding to the cosine and sine, respectively, of the roll angle to provide signals $E_{41}$ and $E_{42}$, respectively.

The present invention, as heretofore described, provides a perspective display of a synthetic real world runway having markers for indicating distance to the runway. The runway display is generated with dashed lines to provide the pilot of an aircraft with a sense of speed as he is landing the aircraft. A display system constructed according to the present invention has a signal generator for generating deflection voltages for the synthetic runway and the deflection voltages are modified in accordance with sensed condition signals and signals received from the airport. With this arrangement, a smaller number of parts are required than were used heretofore in systems providing a runway display.

What is claimed is:

1. A system in an aircraft for displaying a perspective synthetic runway corresponding to a runway at an airport; comprising means for providing deflection voltages and bright-up pulse voltages for displaying a synthetic runway; means for providing signals corresponding to the location of the aircraft with respect to the airport runway; means for providing signals corresponding to the attitude of the aircraft; means for providing a signal corresponding to the altitude of the aircraft; means connected to the voltage means and to each signal means for modifying the deflection voltages in accordance with the location, attitude and altitude signals; a cathode-ray tube connected to the modifying means and to the voltage means for displaying the perspective synthetic runway corresponding to the airport runway in accordance with the modified deflection voltages from the modifying means and with the bright-up pulse voltages from the voltage means; each cycle of a predetermined program of deflection voltages divided into eight time periods and the voltage means including means for providing a first horizontal deflection voltage, means for providing a second horizontal deflection voltage, means for providing a vertical deflection voltage, means for providing bright-up pulse voltages, and program means connected to each deflection voltage means and to the bright-up pulse voltage means for controlling said means in accordance with said predetermined program to provide deflection voltages and bright-up pulse voltages for the synthetic runway display; the second horizontal deflection voltage means including a voltage divider dividing a positive direct current voltage and providing a plurality of outputs, and first switching means connected to the program means and to the voltage divider for sequentially passing the outputs from the voltage divider during the fourth through seventh time periods in accordance with a signal from the program means to provide a negative going step voltage as the second deflection voltage.

2. A system of the kind described in claim 1 in which the first horizontal deflection voltage means includes switching means connected to the program means and controlled by the program means to pass a negative direct current voltage during the first and second time periods and to pass a positive direct current voltage during third through seventh time periods and not to pass a voltage during the eight time period, means connected to the program means and controlled by the program means for counting timing pulses from the program means and providing a digital output corresponding thereto, a bipolar digital-to-analog converter connected to the counting means and to the switching means converts the digital output from the counting means to an analog voltage having the same polarity as the passed direct current voltage from the switching means, second switching means connected to the program means and controlled by the program means to pass another positive direct current voltage during the second time period, to pass another negative direct current voltage during the fourth through seventh time periods, and a zero amplitude voltage during the first and third time periods, and summing means connected to the digital-to-analog converter and to the second switching means for summing the outputs from the converter and from the second switching means to provide the first horizontal deflection voltage.

3. A system of the kind described in claim 1 in which the first switching means includes a plurality of switches connected to the voltage divider, each switch receiving a different output from the voltage divider, and a counting means connected to the program means and to the switches receiving a pulse during each time period and providing outputs during the fourth through seventh time periods, each output enabling a different switch to pass the voltage received by that switch from the voltage divider.

4. A system of the kind described in claim 1 in which the vertical deflection voltage means includes second switching means connected to the program means and controlled by the program means to pass the first mentioned negative direct current voltage during the first and third time periods, to pass another positive direct-current voltage during the second time period, and to pass a zero amplitude voltage during the fourth through seventh time periods, a bipolar digital-to-analog converter connected to the second switching means and to the counting means and controlled by the passed direct current voltage to convert the digital output from the counting means to an analog voltage in accordance with the passed direct-current voltage from the second switching means, third switching means connected to the program means and controlled by the program means to pass the zero amplitude voltage during the first and third through seventh time periods and to pass another negative direct current voltage during the second time period, an inverter connected to the first switching means and inverting the signal passed by the first switching means, and summing means connected to the converter, to the inverter and to the third switching means for summing the outputs from the converter, inverter and third switching means to provide the vertical deflection voltage.

5. A system of the kind described in claim 1 wherein: the location signals from the location signal means include a signal corresponding to the range of the aircraft from the airport and a signal corresponding to the ground track error angle between the aircraft and the airport runway; the attitude signals from the attitude signal means include a signal corresponding to the roll attitude of the aircraft a signal corresponding to the pitch attitude of the craft and a signal corresponding to the yaw attitude of the aircraft; and the modifying means includes a means connected to the vertical deflection voltage means and to the location signal means for dividing the vertical deflection voltage by the range signal from the location signal means and providing a signal corresponding thereto, means connected to the dividing means and to the altitude signal means for providing a signal corresponding to the product of the signal from the dividing means and the altitude signal from the altitude signal means, summing means connected to the multiplying means and to the attitude signal means and providing a signal corresponding to the sum of the product signal from the multiplying means and the pitch attitude signal from the attitude signal means, and means connected to the summing means and to the attitude signal means for affecting the signal from the summing means in accordance with the roll attitude signal from the attitude signal means to provide a modified vertical deflection voltage.

6. A system of the kind described in claim 1 in which the modifying means also includes means connected to the first horizontal deflection voltage means and to the location signal means for dividing the first horizontal deflection voltage by the range signal from the location signal means and providing a signal corresponding thereto, switching means connected to the first and second horizontal deflection voltage means and to the program means and positively controlled by the program means to pass the first horizontal deflection voltage during the first through third time periods and to pass the second horizontal deflection voltage during the fourth through seventh time periods and to block the horizontal deflection voltages during the eighth time period, means connected to the location signal means and to the switching means for providing a signal corresponding to the product of the passed horizontal deflection voltage from the switching means and the ground track error angle signal from the location signal means, subtracting means connected to the dividing means and to the multiplying means for providing a signal corresponding to the difference between the signal from the dividing means and the signal from the multiplying means, summing means connected to the dividing means and to the multiplying means and providing a signal corresponding to the sum of the signals from the dividing means and the multiplying means, second switching means connected to the multiplying means, to the subtracting means, to the summing means and to the program means and controlled by the program means to pass the signal from the subtracting means during the first time period, to pass the signal from the summing means during the second and fourth through seventh time periods and to pass the signal from the multiplying means during the third time period and to pass no signal during the eighth time period, second summing means connected to the attitude signal means and to the second switching means providing a signal corresponding to the sum of the passed signal from the second switching means and the yaw attitude signal from the attitude signal means, and means connected to the second summing means and to the attitude signal means for affecting the signal from the second summing means in accordance with the roll attitude signal from the attitude signal means to provide a modified horizontal deflection voltage.

* * * * *